United States Patent [19]

Cormier et al.

[11] 4,374,415
[45] Feb. 15, 1983

[54] HOST CONTROL OF SUSPENSION AND RESUMPTION OF CHANNEL PROGRAM EXECUTION

[75] Inventors: Roger L. Cormier, Pleasant Valley; Robert J. Dugan, Hyde Park; Richard R. Guyette, Hopewell Junction; David H. Wansor, Hyde Park, all of N.Y.

[73] Assignee: International Business Machines Corp., Armonk, N.Y.

[21] Appl. No.: 168,876

[22] Filed: Jul. 14, 1980

[51] Int. Cl.² .............................................. G06F 3/04
[52] U.S. Cl. ..................................... 364/200; 364/900
[58] Field of Search ... 364/200 MS File, 900 MS File

[56] References Cited

U.S. PATENT DOCUMENTS 3,528,062  9/1970  Lehman et al. .................. 340/172.5
3,725,864  4/1973  Clark et al. ...................... 340/172.5
3,728,693  4/1973  Macker et al. ...................... 364/200
3,898,623  8/1975  Cormier ............................ 340/172.5

OTHER PUBLICATIONS

IBM TDB, vol. 16, No. 7, Dec. 1973, R. L. Cormier, "Suspension and Restart of Input/Output Operations".
IBM TDB, vol. 20, No. 1, Jun. 1977, R. L. Cormier & R. J. Dugan, "Suspension and Restart While Command Chaining".

Primary Examiner—Gareth D. Shaw
Assistant Examiner—Terence Flyntz
Attorney, Agent, or Firm—James E. Murray

[57] ABSTRACT

Apparatus is provided to permit a processor to interrupt computer input/output operations and later resume the same operations. The apparatus disconnects the input-/output device involved in the operations from the channel to free the channel for other operations during the suspension.

3 Claims, 7 Drawing Figures

FIG.1  INSTRUCTION
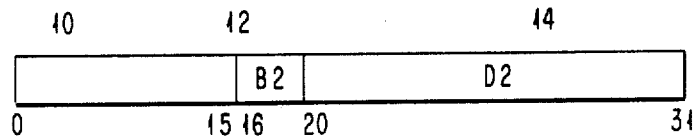
FIG.2  CHANNEL ADDRESS WORD (CAW)
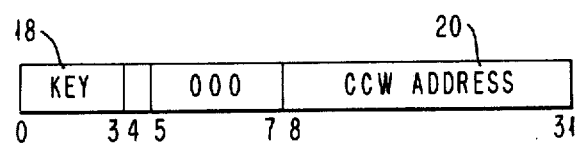
FIG.3  CHANNEL COMMAND WORD (CCW)
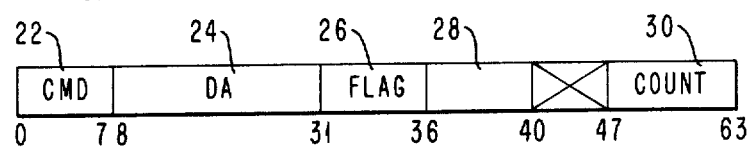
FIG.4  CSW FORMAT
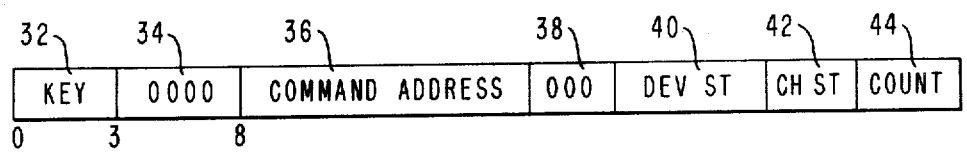
FIG.5  RESUME I/O INSTRUCTION FORMAT
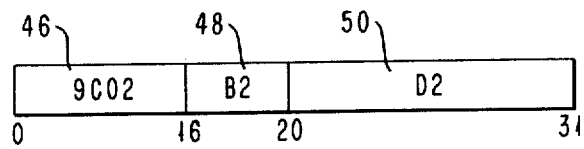

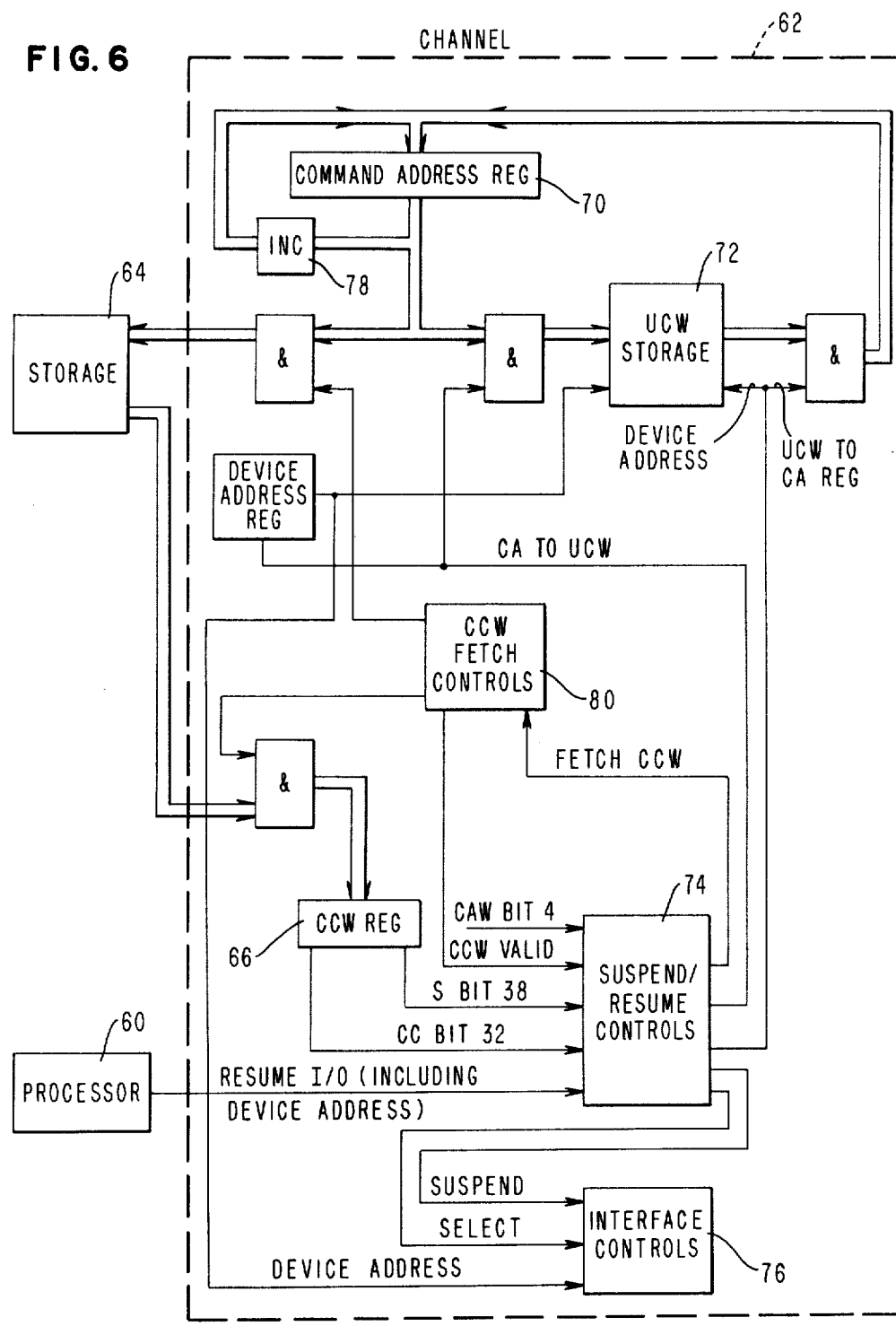

HOST CONTROL OF SUSPENSION AND RESUMPTION OF CHANNEL PROGRAM EXECUTION

BACKGROUND OF THE INVENTION

This invention relates to the control of chained data transfers between input/output devices and main memory in a data processing system and more particularly to the suspension and resumption of such chained data transfers between I/O devices and a computer memory.

Modern computer systems include data channels which control the movement of data between input/output devices and main storage for the computer. Channels relieve the central processing unit (CPU) of directly controlling the I/O devices and permit data processing to proceed concurrently with input/output operations. As described in the manual entitled "IBM System 370 System Principles of Operation" Fourth Edition, published by IBM Corporation in September 1974, an IBM system/370 central processing unit (CPU) initiates operations between input/output devices and main storage for such a system by means of a Start I/O instruction. This instruction addresses a particular channel and an I/O device. In response to the instruction, the channel fetches a channel address word (CAW) from a fixed location in main storage. The CAW specifies the storage protection key and the address of the first channel command word (CCW) associated with the Start I/O. A CCW specifies the command to be executed and, for commands initiating I/O operations, it designates the storage area associated with the operation. The channel interprets the command in the CCW and takes over its execution. At the completion of the execution, the channel issues an interrupt to the CPU and provides information in the form of a channel status word (CSW) describing the results of executing the I/O operation.

In many applications, it is necessary to perform a plurality of CCWs in sequence. To avoid the requirement of issuing a start I/O and an interruption for each CCW in the sequence, a procedure called chaining can be used. Flags contained in each CCW specify when chaining is to occur. When chaining is performed, after the transfer of information specified in the first CCW, a second CCW is fetched without the intervention of an interrupt followed by a second Start I/O instruction.

Chaining usually takes place between CCWs located in successive locations in storage. It proceeds in ascending order of storage address with the address of a new CCW obtained by adding 8 to the address of the current CCW. However, CCWs located in non-continuous storage areas can also be coupled together for chaining purposes by use of a linking CCW which specifies a command which is called a transfer in command and contains the address of the non-continuous CCW in its address field.

Two types of chaining are provided, chaining of data and chaining of commands. The chaining of data locations in storage is indicated by setting the chain data (CD) flag to 1, while the chaining of various CCW commands is established by setting the chain command (CC) flag to 1. What we are concerned with here is command chaining.

Once a channel has initiated a command chaining operation, the channel is dedicated to the device and that operation until completed. At times it becomes desirable to interrupt the chaining without ending the dedication of the I/O device to the chaining function.

A way of interrupting chaining is to use a CCW calling for a transfer in channel command and specifying the address of the previously executed CCW in its address field. The problem with this approach is it ties up the channel and subchannel during the suspension while repetitively executing the last and the next to last CCWs.

Another approach to interrupting chaining is the suspension and resumption of chained CCWs as seen in U.S. Pat. No. 3,728,693. With this approach, the device interrupts the chain but must periodically re-establish connections with the channel to determine if the program should be resumed. As a result, the channel is not available to work with other devices attached to the channel during the suspended operation.

In U.S. Pat. No. 3,898,623 a channel with the capability of suspending and resuming execution of chained commands with devices is described. The scheme described in this patent permits the channel to execute operations involving other devices while a device is suspended.

THE INVENTION

In accordance with the present invention means are provided to enable the suspend and resume functions to be exercised by programmers without overly tying up the processor or the channel involved with the operations. For this purpose, CCWs and CAWs are both provided with an additional flag bit referred to hereinafter as a suspend bit. When the suspend bit is set to 1 in the CAW and in one or more of the CCWs in the chain established by the CAW, a channel configured in accordance with the present invention will suspend operation with a device and store a status word identifying the main memory address of the CCW at which suspension occurred when it reaches a CCW with the suspend bit set to 1. To permit resumption of suspended operations, a new program function called Resume I/O is provided. The Resume I/O function specifies the resumption of the operation of the particular I/O device and identifies the suspended device and channel to be used to perform the suspended operation. While the chained functions are suspended, the device is disconnected from the channel. The channel is then free to operate with other devices so as to not tie up the channel or the processor to the extent necessitated by the prior art schemes.

Therefore, it is an object of the present invention to provide a new method of suspending and resuming chained I/O CCWs.

It is a further object of the invention to provide the processor with control over the progress of a chained I/O CCWs.

It is a further object of the present invention to provide processor control over chained I/O CCWs without the necessity of tying up the channel or processor.

THE DRAWINGS

This and other objects and advantages of the invention can best be seen by reference to the accompanying figures of preferred embodiment of the invention of which:

FIGS. 1 to 5 are the bit formats of an I/O instruction, a channel address word (CAW), a channel command word (CCW), a channel status word (CSW), and a resume I/O instruction, respectively, as they are used in the present invention.

FIG. 6 is a block diagram incorporating the present invention.

DETAILED DESCRIPTION

Figure 7:
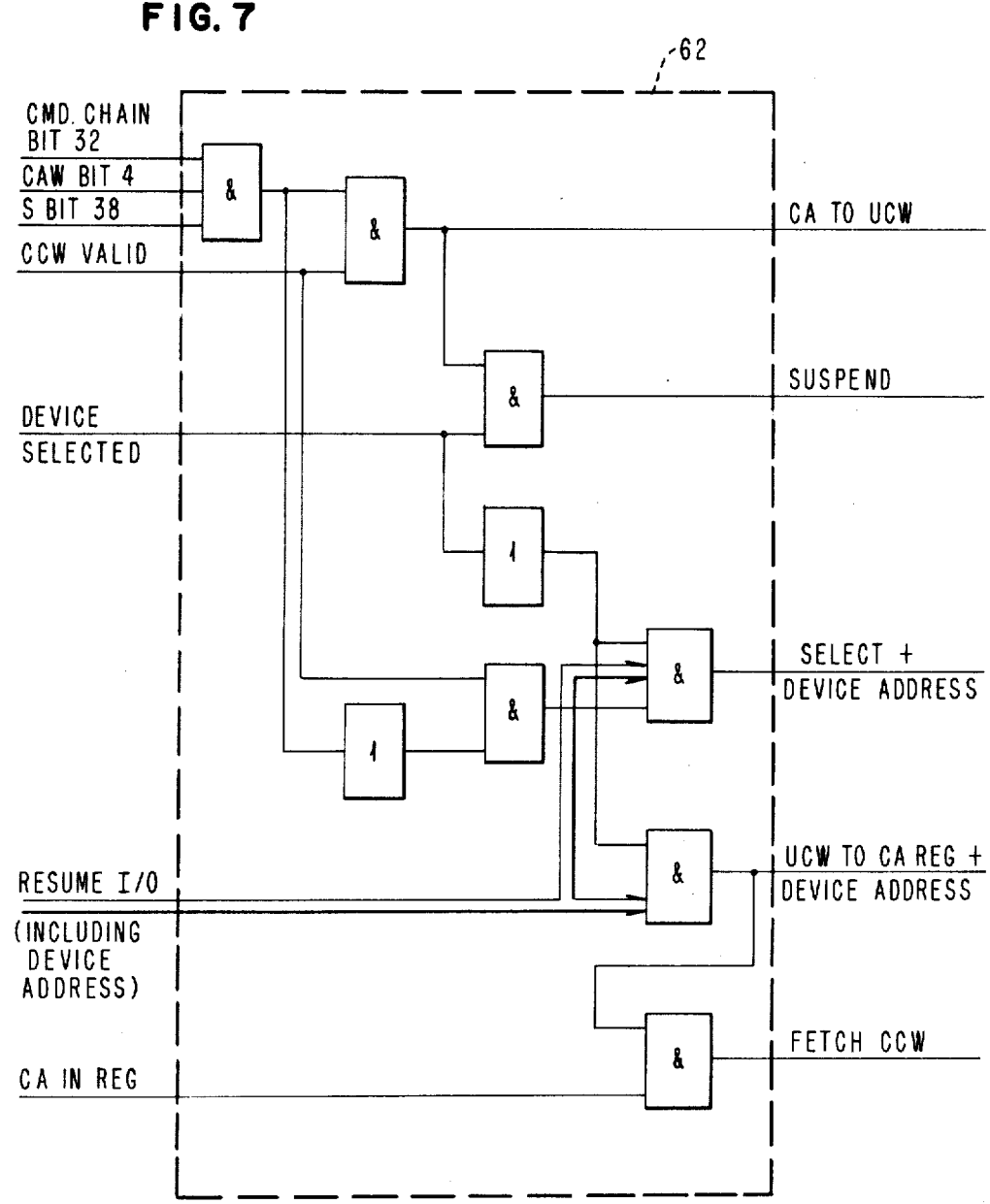
FIG. 7 is a logic for the suspend control block of FIG. 6.

The present invention is described with respect to a data processing system which operates in accordance with the description in the above referenced IBM Systems 370 Principles of Operations Manual which can be found in the IBM reference library and a copy of which can be obtained by contacting any IBM Branch Office.

U.S. Pat. No. 3,488,633, entitled "Automatic Channel Apparatus", issued on Jan. 6, 1970, discloses a channel operation which is incorporated herein by reference. Furthermore, channel structure of the above mentioned U.S. Pat. No. 3,898,623, issued in August 1975 is incorporated herein by reference.

As pointed out previously, system performance improvement is realized when heavy users of I/O resources adopt the programming technique known as chain scheduling of I/O operations. Using this technique, the program chains new I/O operations on the end of a chain of commands already in execution. The performance improvement is realized when the new I/O operation is initiated via command chaining in the channel rather than ending the previous I/O operation with an I/O interruption followed by Start I/O or Start I/O Fast Release to initiate the new I/O operation.

To be effective, the program must be able to stay ahead of channel execution of the chain of commands by adding new commands to the chain before the channel execution reaches the end of the chain. Since this is not always the case, the effectiveness of this technique is reduced in proportion to the number of times the channel executes the last CCW of the chain before the program has added new CCWs, thus requiring an I/O-interruption—I/O-redrive to initiate a new I/O operation at the device.

The introduction of suspension and resumption of channel-program execution as envisioned in this invention allows the program to always win the race to the last CCW. For this purpose, a new flag bit is defined in the CCW that causes the channel to suspend channel-program execution prior to the execution of the CCW containing the flag bit. If necessary, the program can be made aware of the suspension by causing the channel to perform a program-controlled interruption (PCI). Furthermore, a new I/O instruction is defined that causes the channel to resume the execution of a suspended channel program. The overhead required to execute the new I/O instruction is less than that typically encountered when executing either a Start I/O or Start I/O Fast Release. By using the new control bit and instruction, the program can control the progress of channel-program execution and thus avoid all unnecessary channel-program-end interruptions and the consequent I/O redrive.

In order that a suspended channel-program execution not tie up the I/O interface, all existing devices and any new devices that do not need to be aware of channel-program suspension and resumption treat them as normal ending and initiating sequences. These devices treat the suspend signal as the termination of one chain of commands and the resume signal as the initiation of a new chain of commands signaled by either a Start I/O or Start I/O Fast Release. However, the channel treats the two chains as a single channel program that is temporarily suspended and then subsequently resumed.

Referring to FIG. 1, an instruction format is described comprising 32 binary bit positions. The instruction format comprises an operation code field 10 the $B_2$ field 12, and the $D_2$ field 14. The operational code 10 is sixteen binary and may describe a Start I/O, Test I/O, Halt I/O and Test Channel operation. Bits 16-31 of the second operand identified by fields 12 and 14 identify the channel subchannel and device to which the instructions apply.

A Start I/O operation directs the channel identified in the Start I/O instruction to enter a fixed location in storage and obtain what is referred to as a channel address word (CAW), the format of which is in FIG. 2. This is identical to prior art start I/O operations.

Essentially, the CAW is an indirect address providing the location of the desired command to the channel and I/O device as to what operation is to be performed. The CAW has 32 binary bit positions including a key field 18 and a CCW address field 20. The key, field 18, is matched with a key in main storage whenever a reference is made to storage during I/O operation. The command address field specifies the location of a channel command word (CCW) which describes the particular I/O operation to be performed. The CAW of the present invention differs from prior art CAW by the inclusion of a suspend control bit in bit position 4. When bit 4 is set to 1 suspend control is specified. When bit 4 is set to 0, suspend control is not specified in any CCW. The setting of the suspend control bit applies to all CCWs of the channel program identified by that CAW.

Referring to FIG. 3, a channel command word (CCW) format 64 bit positions plus 8 parity bits includes an command code field 22 of eight bits; a data address field of 24 bits; a flag field of five bits 26; a buffer field 28 of two bits, and a count field 30 of 16 bits. The bits positions 40 through 47 are ignored. The command code field 22 specifies the operation, i.e., read, write, etc. to be performed. The data address field 24 specifies a storage location in the main storage when the data is to be stored or read. The count 30 specifies the number of data bytes to be transferred. The flag field comprises a chain data flag bit, a chain command flag bit, a suppress incorrect length indication flag bit, a skip flag bit, and a program control interruption flag bit.

Chain command (CC) flag which appears in bit position 32 gives the programmer the option of initiating multiple I/O operations with a single Start I/O or start I/O Fast Release instruction. When the count of a particular CCW is exhausted and the CC flag is on, the channel will fetch the next sequential command. This command will specify a transfer in channel or a new I/O operation to be performed. It also permits a single instruction to specify certain auxiliary functions such as rewinding tape at the end of a data transmission. Command chaining, in conjunction with status modifier bits, permits the channel to modify the normal sequence of operation in response to signal provided by the I/O device. Since command chaining always involves an initiation of new I/O operations, there are no restrictions on its use.

Bit 38 when validly set to 1 in the first CCW of a channel program or in a CCW fetched during command chaining causes channel-program execution to be suspended prior to execution of the CCW containing the S-flag.

When a valid CCW is fetched which contains a valid S-flag as described above, the channel performs the suspend function. The suspend function causes channel-program execution to be suspended at the subchannel prior to executing the CCW containing the S-flag and causes the suspension of channel-program execution to be indicated to the device.

If the CCW containing the S-flag also contains the PCI-flag, an interruption condition is generated and made pending at the subchannel or device just as it does in the prior art. The PCI is presented to the program when it is allowed, regardless of whether channel-program execution is suspended or not.

The S-flag can be indicated either in the first CCW of a channel program or in a CCW fetched while command chaining. The S-flag in a CCW is not valid and causes a program-check condition to be recognized if (1) the CAW contains the suspend-control bit set to 0, (2) the CCW is fetched while data chaining, or (3) the suspend function is not available for the subchannel.

Referring to FIG. 4, a channel status word (CSW) format comprises a key field 32, a buffer field 34, a command address field 36, a buffer field 38 a device status field 40, a channel status field 42 and a count field 44. The CSW provides to the program information describing the status of an I/O device or the conditions under which an I/O operation has been terminated. The key field contains the key that was used for the operation. The command address field specifies an address that is eight bytes higher than the last command address used in the operation being performed. The eight bit device status field describes the status of the I/O device presently connected to the channel. The conditions indicated by the field are attention, control unit end, busy, channel end, device end, unit check and unit exception. Each condition may be modified by the presence of the status modifier bit.

The setting of bit 4 of the channel-status word (CSW) to one indicates that the subchannel associated with the status has suspended execution of a channel-program at the time of the interruption.

Channel-program execution is suspended at the subchannel from the time the channel fetches a CCW having a valid S-flag until that channel-program execution is terminated at the subchannel or until a Resume I/O instruction is issued to the subchannel by the processor. During the period of suspension, the storing of a CSW can only occur as a result of the program-controlled interruption (PCI) condition. As in the prior art, the PCI condition may be generated because of a PCI-flag in the CCW containing the S-flag or because of a PCI-flag in a CCW fetched earlier in the chain of commands being executed at the subchannel.

The S condition is not indicated in the CSW stored as a result of executing an I/O instruction. The S condition is not indicated in the CSW stored as a result of an I/O interruption condition generated because of the termination of an I/O operation or chain of operations. The S condition is not indicated in the CSW stored as a result of an I/O interruption when there is no I/O operation or chain of operation in progress at the subchannel.

The format of the Resume I/O (RI/O) instruction is shown in FIG. 5. Execution of the RIO function causes a currently suspended I/O operation to be resumed with the device if the suspend flag causing suspension has been set to zero by the program. If the suspend flag remains set to one or if the I/O operation is not currently suspended, the instruction has no effect. The instruction is executed only when the CPU is in the supervisor state; otherwise, a privileged-operation exception is recognized, and the operation is suppressed.

Bits 16–31 of the second-operand address identify the channel, subchannel, and I/O device to which the instruction applies just like in the instruction format set forth in FIG. 1.

If the channel is not operational, condition code 3 is set just like in the prior art, and no action takes place. If the channel is operational, condition code 0 is set. If a channel-program execution is currently suspended or in the process of being suspended at the subchannel, the channel is signaled to perform the resume function. If no channel-program execution is currently suspended or in the process of being suspended at the subchannel, the resume function is not performed by the channel. A channel-program execution is in the process of being suspended if a channel-command word (CCW) has been fetched by the channel which contains a valid S-flag but the suspend function has not yet been completed.

The resume function is performed by the channel, logically subsequent and asynchronous to the execution of RIO that provided the stimulus. The resume function causes the channel to refetch the CCW that previously caused the channel to perform or be in the process of performing the suspend function and to process it normally with one exception. The exception is that if the suspension of the channel-program execution has been indicated to the device and the resumption causes the channel to initiate a new I/O operation at the device, the channel indicates to the device that channel-program execution is being resumed with the new I/O operation.

The operand address of RIO is interpreted as the I/O address of the target device (same as for SIO). It is the responsibility of the program issuing RIO to ensure that RIO is issued to the correct channel set since the I/O address is interpreted relative to the channel set currently connected to the CPU executing RIO.

Systems with the suspend/resume facility interpret the following operation codes as shown:

| Operation Code | Interpretation |
| --- | --- |
| 9C00 | START I/O |
| 9C01 | START I/O FAST RELEASE |
| 9C02 | RESUME I/O |
| 9C03-9CFF | Invalid operation |

If the PCI flag is included in a CCW with the S-flag, multiple PCI interruptions can occur even through the CCW is not executed because of the S-flag.

As described previously, an I/O operation is initiated when the central processing unit (CPU) 60, shown in FIG. 6, executes an instruction having the format shown in FIG. 1. The instruction specifies the type of operation, the channel address and the input/output control unit and device to be selected. In a procedure described in U.S. Pat. No. 3,488,633, a start I/O instruction directs the channel 62 to enter main storage 64 at a designated location and obtain a channel address word (CAW), whose format is shown in FIG. 2, to provide the location in main storage of the first of a series of channel command words (CCWs). The channel 62 enters main storage at the location indicated by the CAW and obtains a channel command word in the format illustrated by FIG. 3 and places the CCW in the channel CCW register 66. Each CCW includes an command code field, a data address field pointing to a location address in main storage, and a count field which indicates the number of data units to be transferred, beginning at that location address.

The channel executes the operation specified in the command code field of the CCW on the data at the address specified by the data address and count fields of the CCW. If bit 32 of the CCW is 1, command chaining is indicated and after the completion of this first CCW, a second sequentially arranged CCW, or a CCW at some specified location, is fetched by the channel from main storage 64, placed in register 66 and executed. So long as the bit 38 of a CCW is 0, the channel obtains a successive CCW from the memory and executes it in the manner set forth in the prior art. However, in accordance with the present invention, when a CCW with bit 38 set to 1 is reached, the channel 62 suspends the operation of the I/O device through the signal interface control 76. The main memory address of the CCW containing the 1 in bit position 38 is fed from the channel command address register 70 into the unit control word (UCW) storage 72 with bit 4 set to indicate a suspended function. Also, the device involved in the suspended function is disconnected from the channel and subchannel. The channel is then free to operate with other subchannels. However, the device and subchannel remain dedicated to the suspended function until a resume I/O instruction, illustrated in FIG. 5, is issued.

The suspend operation is controlled by the suspend controls. When a CCW with command chaining bit 32 and a suspend bit 38 set to 1 is placed in a CCW register 66, a control signal referred to as a command address to the unit control word storage (CA to UCW) is used to gate the command address to the UCW storage 72 if the CAW establishing the CCW also has bit 4 set to 1 and if the CCW is also a valid CCW as indicated by the CCW fetch controls 80. This combination of signals also generates suspend control signals for the device and feeds it to the interface control 76. Interface control then disconnects the device to be suspended from the channel and subchannel as mentioned above.

The channel-program execution and subchannel remains suspended until a resume instruction identifying the device, illustrated in FIG. 5, is executed by the processor. When the processor 60 executes a resume I/O instruction it transmits a resume bit and the device address to the suspend controls 74. The suspend controls 74 generate a select signal which is fed with the device address to the interface controls 76 to generate select controls for the device. Upon receipt of the resume signal, the suspend controls 74 also generate a signal to access the UCW storage 72 and feed the stored command address of the suspended channel program into the command address register 70. The suspend controls also issue a fetch CCW command signal to the CCW command fetch controls 80 so that the address in the command address register 70 is used to fetch the CCW from the specified address into the CCW register 66. If the refetched CCW does not have a 1 in bit position 38, command chaining continues as in the prior art.

One embodiment of this invention has been described. Obviously, a number of changes can be made in this invention without departing from the spirit and scope of the invention.

Having thus described our invention, what we claim as new, and desire to secure by Letters Patent is:

1. In an input/output device control mechanism responsive to a programmed input/output (I/O) instruction such as START I/O executed by a processor to obtain a channel address word (CAW) from a storage unit which provides the location in the storage unit for obtaining the first of a series of channel command words (CCWs) to be executed in sequence by a particular I/O device through a channel and a subchannel of the I/O device control mechanism, the improvement comprising:

suspend means in said control mechanism for causing suspension of the execution of said series of CCW's and for disengaging said device from said channel at any CCW in said series containing a manifestation to so stop execution of said CCWs, said suspend means having disabling means for preventing the suspension in absence of an enabling manifestation in said CAW authorizing said suspension; and resume means in said control mechanism for causing the resumption of the execution of the series of CCWs at said any CCW at which a suspension occurs said resume means being responsive to a command to said I/O device control mechanism from said processor which command was generated by said processor in response to a programmed instruction to continue execution of said series of CCWs.

2. The input/output device control mechanism of claim 1 wherein said suspend means includes means for storing a channel status word (CSW) indicating said CCW and a manifestation indicating said devices operation was temporarily stopped in response to said suspend means.

3. The input/output device control mechanism of claim 2 wherein said resume means includes means for executing the CCW at the address indicated in said CSW.

* * * * *